March 19, 1968  T. D. LODE  3,374,430
ELECTRICAL RESISTANCE STANDARD HAVING AN OUTPUT VOLTAGE
REPRESENTATIVE OF APPLIED FREQUENCY, AND OF RESISTIVITY
AND PERMEABILITY OF A CONDUCTING MEDIUM
Filed Jan. 14, 1965
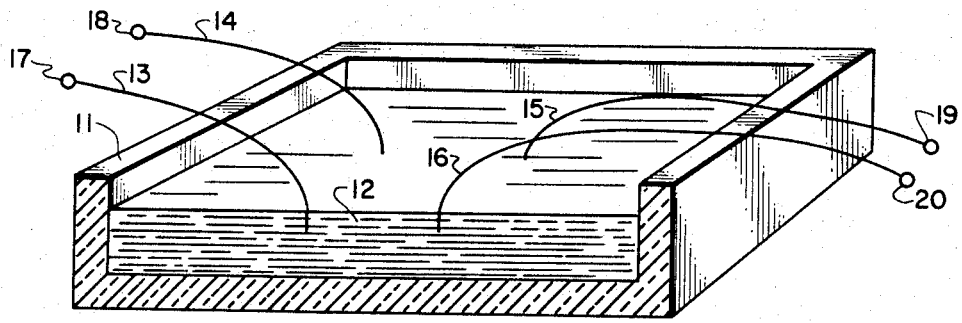
INVENTOR
TENNY D. LODE

United States Patent Office 3,374,430
Patented Mar. 19, 1968

3,374,430
ELECTRICAL RESISTANCE STANDARD HAVING AN OUTPUT VOLTAGE REPRESENTATIVE OF APPLIED FREQUENCY, AND OF RESISTIVITY AND PERMEABILITY OF A CONDUCTING MEDIUM
Tenny D. Lode, Madison, Wis., assignor to Rosemount Engineering Company, Minneapolis, Minn., a corporation of Minnesota
Filed Jan. 14, 1965, Ser. No. 425,420
7 Claims. (Cl. 324—64)

This invention relates to standards of electrical resistance. More particularly, it relates to a method and means for the construction and operation of standards of electrical resistance without precise measurement of length or mass.

The wave lengths of certain spectral lines of light have become accepted as absolute standards of length. The meter as a unit of length is now defined as 1,650,763.73 wavelengths of a particular spectral line emitted by isotope 86 of krypton gas. It is very desirable to define a standard in terms of such a fundamental property of nature. Once such a definition has been made and accepted, any laboratory may build or purchase a suitable krypton lamp and measure length with absolute accuracy. It is no longer necessary to rely entirely on working standards which must be periodically calibrated at a central standards laboratory.

Unfortunately, the standards situation for electrical measurements is far less satisfactory. The unit of resistance, the ohm, has been defined in terms of the so-called fundamental units of mass, length and time plus an assumed value for the magnetic permeability of free space. In theory any laboratory could derive a standard of resistance from these fundamental definitions. In practice, this is sufficiently difficult so that it is normally performed only at the National Bureau of Standards and other national laboratories such as the National Physical Laboratory of England. Even at these laboratories, standard resistors are used to provide day-to-day resistance references, and absolute calibration is obtained by periodically calibrating the standard resistors.

The usual procedure for establishing standards of resistance at outlying laboratories is to ship standard resistors to a central standards laboratory for calibration and then back to the outlying laboratory for use as a calibrated reference. This is not a trivial procedure as changes in temperature or humidity or mechanical shock may change the value of the standard resistance. It generally requires the calibration of a number of different standard resistors at different times by a central standards laboratory and many back and forth shipments of individual standard resistors to establish confidence in a precise resistance standard maintained at an outlying laboratory.

An object of this invention is to provide a method and means for the construction of precision standards of resistance. A further object is to provide such standards of resistance with convenience, availability, and reproducibility similar to that achieved by the use of spectral lines of light as a length standard.

In a particular form of the present invention, the surface resistance of a pool of purified mercury is measured with an alternating current of precisely known frequency. The surface resistance will be a function of the resistivity and magnetic permeability of the mercury and the measuring frequency. The measured surface resistance will be essentially independent of the quantity of mercury and the absolute dimensions of the apparatus. The surface resistance value for a particular frequency is taken as a standard resistance value.

In the drawing:
The figure is a section view and pictorial illustration of a first form of the invention arranged for the measurement of the surface resistance of a pool of a liquid metal such as mercury.

Referring now to the drawing, the figure includes tank 11 containing pool 12 of purified mercury. Lead wires 13, 14, 15 and 16 electrically contact pool 12 at four points corresponding to the corners of a square. Terminals 17, 18, 19 and 20 are connected to leads 13, 14, 15 and 16, respectively.

It is well known that alternating currents passing through a conductor of simple shape tend to concentrate near the outer surface. The "skin depth" $d$ is given by the expression $$d = \frac{1}{\sqrt{\pi f m / r}}$$

where $f$ is the frequency, $m$ the magnetic permeability and $r$ the resistivity of the material. If the curvature of the conductor is large with respect to the skin depth the current density will decrease exponentially with the distance from the surface reaching $1/e$ times the surface value at a distance equal to the skin depth. If the alternating current surface resistance of the conductor is measured, the value will correspond to that of a layer whose thickness is essentially equal to the skin depth. The "surface resistance" is resistivity divided by thickness and corresponds to a measurement of the resistance between two opposite edges of a thin square sheet. For example, consider a measurement of the resistance between two opposite edges of a thin square sheet having a thickness $t$ and side length $l$. The resistance is $rl/lt$ or simply $r/t$ and is commonly called surface resistance. The apparent surface resistance of this layer whose thickness is essentially $d$ will be $r/d$ or $$R_s = \sqrt{\pi f m r}$$

where $R_s$ is the apparent surface resistance in ohms per square. The surface resistance has only the dimensions of resistance and does not include dimensions of length or mass. Hence, a standard resistance value may be established in terms of the bulk properties of a material and a frequency.

It is generally believed that the resistivities of pure conductive materials in strain free or annealed form are stable and reproducible. However, resistivity is measured in ohm centimeters, which includes the dimensions of both electrical resistance and an absolute length. Hence, to establish a standard value of resistance from the resistivity of the material generally requires the precise measurement of one or more absolute lengths. In the early 1900's several standards of resistance were defined in terms of mercury columns of specified dimensions. However, the measurement of all of the significant dimensions of such a precision resistance standard is quite difficult. Hence, this method is no longer widely used.

In the present invention, the skin depth serves as the absolute length which is required for the establishment of a standard of resistance from the resistivity of a material.

The structure of the figure is measured as a four-terminal resistor with two adjacent leads being considered as the current leads and the other two adjacent leads being considered as the voltage leads. For more precise measurement, each of the four possible combinations of current and voltage lead connections to the four terminals may be used for measurement and the resistance value taken as the average of the four. Such averaging will reduce the effects of small deviations from a square contact pattern. The measured resistance will be essentially independent of the absolute dimensions of the square contact pattern so long as $d$ is small compared to electrode separation so that the measured resistance may be considered a "surface resistance."

The preceding description has mentioned the use of a liquid metal such as mercury as the material whose resistivity is used for the establishment of a standard resistance value. Mercury has the advantage that it may be easily refined to a high purity. An advantage of a liquid metal is that it is obviously free from mechanical strain which may affect the resistivity of a solid material. However, various solid metals and in general a variety of liquid and solid conductors may be used within the spirit of this invention. The connection of four leads to the surface of a material at four points corresponding to the four vertices of a square has been specifically described. Other connection arrangements may be used if desired.

What is claimed is:

1. The method of establishing a voltage representative of a standard value of frequency and representative of the resistivity and permeability of a conducting body comprising the steps of: making four spaced electrical connections, each connection being made directly to a surface of a conducting body having a known value of the product of resistivity and permeability and each connection being made to the surface at a location spaced from the other connections in a known surface spacing relation; applying an alternating current through two of said spaced connections, said alternating current having a precisely known frequency of sufficiently high rate such that the electromagnetic skin depth in said conducting body is small compared to the spacing between any two of said connections; and connecting the other two spaced electrical connections to voltage measurement means; whereby said voltage is substantially proportional to the square root of the product of resistivity, permeability, and frequency.

2. The method of claim 1 further characterized in that said conducting body is prepared by partially filling a container with conducting liquid and making said spaced electrical connections to said liquid.

3. The method of claim 1 further characterized by making said electrical connections at the four corners of a square pattern; making four separate voltage measurements, each of which is made by passing said alternating current through two adjacent connections with at least one connection being different at each said separate voltage measurement; measuring the voltage developed across the other two connections; and averaging said four voltage measurements.

4. Apparatus for establishing a voltage representative of a known value of frequency and representative of resistivity and permeability of a conducting body comprising; a conducting body having a known product of resistivity and permeability and having four spaced electrical connections arranged on a planar surface of said body, each of said connections being arranged with a relatively known spacing relation to the other connections, means for passing an alternating current through two of said connections, said alternating current having a precisely known frequency of sufficiently high rate such that the electromagnetic skin depth in said conducting body is small compared to the spacing between any two of said connections, and means for measuring the voltage developed at the other two connections, whereby said voltage is substantially independent of the absolute values of spacing dimensions of said connections and is substantially proportional to the square root of resistivity, permeability, and frequency.

5. The apparatus of claim 4 wherein said conducting body comprises a conducting liquid housed in a container.

6. The apparatus of claim 5 wherein said four spaced electrical connections are made at the four corners of a square.

7. The apparatus of claim 5 wherein said four spaced electrical connections are spaced remotely from the interior surfaces of said container so that said voltage is substantially independent of the presence of said interior surfaces.

References Cited

UNITED STATES PATENTS

| | | | |
|---|---|---|---|
| 2,417,099 | 3/1947 | Windeler | 324—62 XR |
| 2,586,868 | 2/1952 | Scott | 324—64 |
| 2,737,810 | 3/1956 | Dewitte | 338—222 XR |
| 3,163,817 | 12/1964 | Simpson | 324—52 |

RUDOLPH V. ROLINEC, *Primary Examiner.*

WALTER L. CARLSON, *Examiner.*

E. E. KUBASIEWICZ, *Assistant Examiner.*